Patented May 27, 1930

1,760,076

UNITED STATES PATENT OFFICE

CARL S. MINER, OF CHICAGO, ILLINOIS, ASSIGNOR TO THE QUAKER OATS COMPANY, OF CHICAGO, ILLINOIS, A CORPORATION OF NEW JERSEY

DYE SOLUTION

No Drawing.   Application filed February 4, 1927.   Serial No. 166,008.

This invention relates to improved dye solutions and new solvents for use in the preparation thereof, and it has special reference to dye solutions for dyeing leathers, canvas or other materials that are commonly employed for shoes, gloves and the like.

Heretofore it has been customary to use such materials as either nitrobenzene or aniline in the preparation of shoe dyes. Each of these compounds was used for two reasons: first, each is a solvent for the dyes and; second, each possesses the property of rapidly penetrating the leather, thereby acting as a vehicle to carry the dye into the leather, and, on evaporation, depositing the color in such fastness that it was not easily removed by subsequent polishing of the colored leather.

Many instances of severe and fatal poisoning to persons have resulted from the toxic action induced by the wearing of shoes that were dyed with shoe dyes comprising either nitrobenzene or aniline, as aforesaid, which shoes were dyed while on the feet of the wearers or were worn subsequent to their being dyed but before these solvents had evaporated.

Because of this toxic action, described above, it is highly desirable to find substances possessing the solvent and penetrating powers necessary to produce a quick, permanent and complete dyeing of the leather and the like, and, at the same time, sufficiently non-toxic to be safe when the shoes or gloves are worn soon after the dye has been applied, and before the solvents have evaporated.

I have discovered that many of the furan derivatives, especially furfural which is the best known and commercially available, possess properties which make their application to the preparation of shoe dyes highly advantageous. I have discovered that these furan derivatives are solvents for many of the dyes such as spirit, water and oil soluble dyes thereby producing solution of relatively high concentration. I have also discovered that said furan derivatives have strong penetrating properties for leather, fabrics, such as canvas, wood, and other porous materials. I have also discovered that such furan derivatives, particularly furfural, are so innocuous on external application to human beings as to make possible their use in shoe dyes without deleterious effects on the wearer of the shoes. The furan derivatives which I employ, as described above, are also miscible with other solvents commonly used in the preparation of stains and dye solutions.

I shall illustrate my invention by describing the solvents I have used and the manner in which I have employed them for making the dye solutions, without limiting myself to the special concentrations of the ingredients.

One preparation that I have found satisfactory consists of 60–75 parts of alcohol, 20–25 parts of furfural and 5–10 parts of spirit soluble nigrosene, a spirit soluble dye identified as color index No. 864 or Schulz No. 698. The mixture is agitated in any sort of mixing machine until the dye is dissolved and the mixture is homogeneous, after which the solution may be filtered, if necessary, to remove any insoluble material.

This solution may be applied to the surface of the leather to be dyed and after drying for a suitable period of time, the dyed surface may be polished by the usual methods.

In place of furfural in the above described specific illustration of my invention other furfural derivatives may be used such as the esters of furoic acid, or example, methyl, ethyl, propyl, butyl, or amyl furoates. Other derivatives such as furfuryl alcohol, furyl acetate and tetrahydro furfuryl alcohol may also be used.

It is to be understood that dyes other than spirit soluble nigrosene, identified above, can be used, such as water soluble, oil soluble and other spirit soluble dyes, to produce a wide variety of colors and that the furan derivatives can be used as the sole solvent or mixed with solvents other than alcohol.

From the foregoing it will be obvious that my invention may be applied in preparing dye solutions for coloring materials other than leather and is applicable to a wide range of materials.

While I have herein described my invention and one specific illustrative example for practicing the same, it is understood that I do not desire to be limited to any of the specific details outlined above other than those set forth in the appended claims.

I claim:

1. A composition of matter comprising a dye dissolved in a solvent comprising a furan derivative.

2. A composition of matter comprising a dye dissolved in a solvent comprising a furan derivative and an alcohol.

3. A composition of matter comprising a dye dissolved in a solvent comprising furfural.

4. A composition of matter comprising a dye dissolved in a solvent comprising furfural and an alcohol.

5. A composition of matter comprising a spirit soluble dye dissolved in a solvent comprising furfural and an alcohol.

6. A leather dye comprising spirit soluble nigrosene dissolved in furfural and an alcohol.

7. A composition of matter comprising a spirit soluble dye dissolved in a solvent comprising a furan derivative.

8. A composition of matter comprising a spirit soluble dye dissolved in a solvent comprising a furan derivative and an alcohol.

9. A leather dye comprising spirit soluble nigrosene dissolved in a solvent comprising a furan derivative.

In witness whereof, I have hereunto subscribed my name.

CARL S. MINER.